T. B. MILLER AND R. A. PAXTON.
TIRE CHAIN.
APPLICATION FILED DEC. 26, 1919.
1,432,484. Patented Oct. 17, 1922.
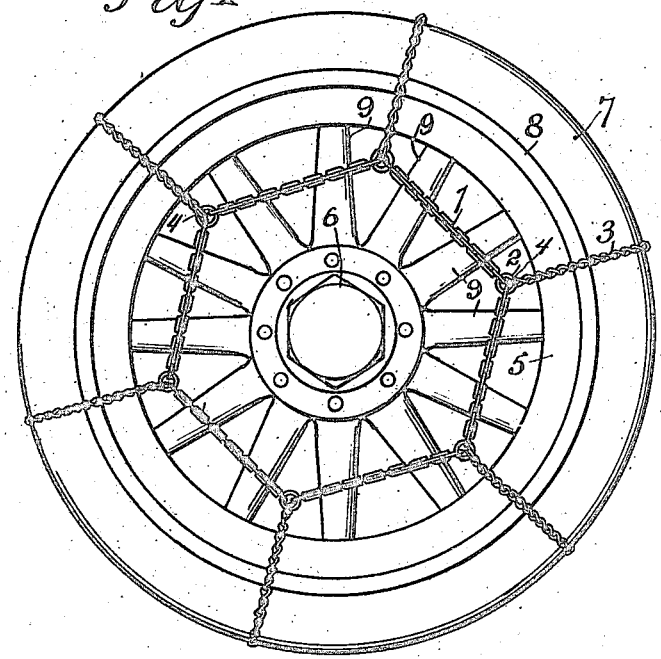
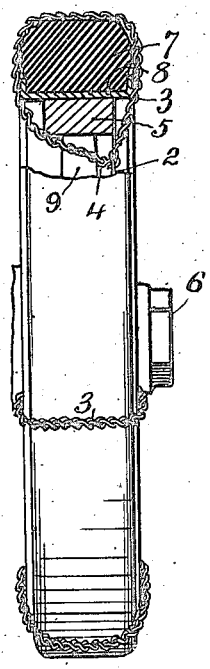
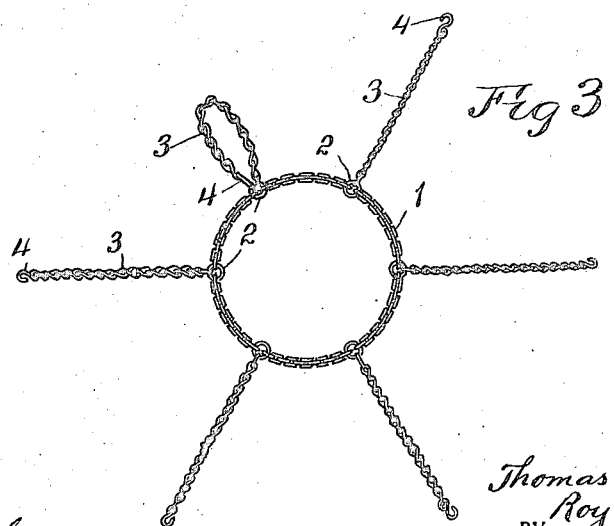
WITNESS:
R. E. Hamilton
INVENTORS.
Thomas B. Miller,
Roy A. Paxton,
BY Warren D. House,
Their ATTORNEY.

Patented Oct. 17, 1922.

1,432,484

UNITED STATES PATENT OFFICE.

THOMAS B. MILLER AND ROY A. PAXTON, OF KANSAS CITY, KANSAS.

TIRE CHAIN.

Application filed December 26, 1919. Serial No. 347,417.

*To all whom it may concern:*

Be it known that we, THOMAS B. MILLER and ROY A. PAXTON, citizens of the United States, residing at Kansas City, in the county of Wyandotte and State of Kansas, have invented a certain new and useful Improvement in Tire Chains, of which the following is a specification.

Our invention relates to improvements in tire chains adapted for releasable attachment to vehicle wheels for traction purposes.

The object of our invention is to provide a tire chain, which may be readily applied to a vehicle wheel, such as that of an automobile truck without jacking up the wheel or turning the same.

A further object of our invention is to provide a traction tire chain, which is exceedingly simple in construction, cheap to manufacture, durable and not liable to get out of order, and which may be easily and quickly attached to or removed from an automobile wheel.

The novel features of our invention are hereinafter fully described and claimed.

In the accompanying drawing, which illustrates the preferred embodiment of our invention, Fig. 1 is a side elevation showing our improved tire chain attached to an automobile wheel.

Fig. 2 is a view of the same, partly in edge elevation and partly broken away.

Fig. 3 is a plan view of our improved traction chain, one of the radial members being shown attached at both ends to the ring chain.

Similar reference characters designate similar parts in the different views.

1 designates a ring member, preferably a circular chain, preferably provided at intervals with rings 2 which are fixed against longitudinal movement and to which are respectively attached one set of ends of radial tread members 3, preferably flexible and comprising chains which have hooks 4 respectively attached at their other set of ends adapted to releasably engage the ring member 1 through the intermediacy of the rings 2.

In applying the tire chain to a vehicle wheel, the ring member 1 is disposed at the outer side of a vehicle wheel 5 so as to encircle the hub 6 thereof, Figs. 1 and 2, after which the tread members 3 are passed around the tire 7 and rim 8 of the wheel, the free ends of the tread members 3 being extended between different sets of spokes 9 of the wheel, the hooks 4 being respectively engaged with the rings 2 to which the tread members are respectively attached, as best shown in Figs. 2 and 3.

With this manner of attachment of the tire chain, the wheel does not have to be jacked up nor turned in either direction, and the chain may be easily and quickly attached or removed.

The spokes 9 will limit the circumferential movement of the tread members 3 on the wheel. The fixed rings 2 retain the tread chains 3 in spaced relationship, so that, in applying the device to a wheel, no time is lost in spacing the tread chains, and the latter are held from slipping off from the circular chain when the device is not in use.

We do not limit our invention to the structure shown and described, as many modifications, within the scope of the appended claim, may be made without departing from the spirit of our invention.

What we claim is:—

A tire chain comprising a circular chain having rings fixed against longitudinal movement thereon, and radial chains attached thereto at one set of ends and adapted to encircle a tire and rim and provided respectively at their other set of ends with hooks adapted for releasable attachment to said fixed rings respectively.

In testimony whereof we have signed our names to this specification.

THOMAS B. MILLER.
ROY A. PAXTON.